(12) United States Patent
Choi (10) Patent No.: US 12,330,606 B2
(45) Date of Patent: Jun. 17, 2025

(54) BRAKE APPARATUS FOR VEHICLE

(71) Applicant: HYUNDAI MOBIS Co., Ltd., Seoul (KR)

(72) Inventor: Moo Jin Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 756 days.

(21) Appl. No.: 17/570,582

(22) Filed: Jan. 7, 2022

(65) Prior Publication Data

US 2023/0131289 A1 Apr. 27, 2023

(30) Foreign Application Priority Data

Oct. 21, 2021 (KR) .................. 10-2021-0140911

(51) Int. Cl.
| | | |
|---|---|---|
| *B60T 13/74* | (2006.01) | |
| *B60T 1/06* | (2006.01) | |
| *F16D 55/02* | (2006.01) | |
| *F16D 65/18* | (2006.01) | |
| *F16D 121/24* | (2012.01) | |
| *F16D 125/50* | (2012.01) | |

(52) U.S. Cl.
CPC ............ *B60T 13/746* (2013.01); *B60T 1/065* (2013.01); *F16D 55/02* (2013.01); *F16D 65/183* (2013.01); *F16D 2121/24* (2013.01); *F16D 2125/50* (2013.01)

(58) Field of Classification Search
CPC ...... F16D 65/18; F16D 55/227; F16D 65/567; F16D 2121/24; F16D 2125/36; F16D 2125/50
See application file for complete search history.

(56) References Cited

U.S. PATENT DOCUMENTS

| | | | | |
|---|---|---|---|---|
| 2016/0290424 | A1* | 10/2016 | Gutelius | F16D 65/183 |
| 2019/0063527 | A1* | 2/2019 | Thomas | F16D 65/14 |
| 2019/0219117 | A1* | 7/2019 | Choi | F16D 65/183 |
| 2020/0309214 | A1* | 10/2020 | Al-Mahshi | F16D 65/183 |
| 2021/0018054 | A1* | 1/2021 | Jo | F16D 55/226 |

FOREIGN PATENT DOCUMENTS

| | | |
|---|---|---|
| DE | 102020130576 B3 | 2/2022 |
| KR | 10-2010-0098846 A | 9/2010 |
| KR | 10-2021-0009245 A | 1/2021 |

OTHER PUBLICATIONS

Office Action issued in corresponding Korean Patent Application No. 10-2021-0140911 dated Apr. 27, 2023, with English abstract.
Office Action issued in German Patent application 102022100102.4 dated May 23, 2022.

* cited by examiner

*Primary Examiner* — Nicholas J Lane
(74) *Attorney, Agent, or Firm* — Morgan, Lewis & Bockius LLP (57) ABSTRACT

A brake apparatus for a vehicle may include: a drive part configured to generate driving power; a pair of pressing parts configured to receive the driving power from the drive part and to apply or release a braking force; a load transmission part installed between the pair of pressing parts and configured to transmit a pressing load of any one of the pair of pressing parts to the other pressing part of the pair of pressing parts; and a load transmission restricting part configured to selectively restrict an operation of the load transmission part by pressing the load transmission part.

10 Claims, 11 Drawing Sheets

BRAKE APPARATUS FOR VEHICLE

CROSS-REFERENCE TO RELATED APPLICATION

This application claims priority from and the benefit of Korean Patent Application No. 10-2021-0140911 filed on Oct. 21, 2021, which is hereby incorporated by reference for all purposes as if set forth herein.

BACKGROUND

Technical Field

The present disclosure relates to a brake apparatus for a vehicle, and more particularly, to a brake apparatus for a vehicle having a pair of pistons.

Discussion of the Background

In general, a parking brake for a vehicle includes a motor and a power transmission device for operating a friction pad installed on a caliper of a disc brake apparatus during parking.

Recently, a parking brake for a vehicle having a structure for pressing a disc using a pair of left and right pistons is applied. In this case, a method of transmitting loads of the left and right pistons using a balancing gear is used to solve a problem that braking performance deteriorates due to non-uniform transmission of loads to the left and right pistons. For example, when a load is applied to the left piston first, a right ring gear is rotated by the balancing gear to synchronize load values of the right and left pistons, which makes it possible to allow the left and right pistons to simultaneously press the pad with the loads.

However, when the brake is disengaged, a piston with a low load is released first and then a piston with a high load is released by the balancing function. Therefore, the piston with the high load is sometimes incompletely released because the release time is restricted. The incomplete release of the piston causes a drag due to a residual load.

The background technology of the present disclosure is disclosed in Korean Patent Application Laid-Open No. 10-2010-0098846 (published on Sep. 10, 2010 and entitled 'Disc Brake Having Parking Function').

SUMMARY

An object of the present disclosure is to provide a brake apparatus for a vehicle, which is capable of allowing pistons to transmit a uniform load when applying a braking force and preventing the pistons from being incompletely released when releasing the braking force.

Various embodiments are directed to a brake apparatus for a vehicle, including: a drive part configured to generate driving power; a pair of pressing parts configured to receive the driving power from the drive part and to apply or release a braking force; a load transmission part installed between the pair of pressing parts and configured to transmit a pressing load of any one of the pair of pressing parts to the other pressing part of the pair of pressing parts; and a load transmission restricting part configured to selectively restrict an operation of the load transmission part by pressing the load transmission part.

The pair of pressing parts may each include: a sun gear part configured to rotate by receiving the driving power from the drive part; a planet gear part configured to rotate while engaging with the sun gear part; a carrier part coupled to the planet gear part; and a piston part connected to the carrier part and configured to press or release a brake pad while extending or retracting by receiving a rotational force from the carrier part.

The load transmission part may include: a pair of ring gear parts configured to rotate while engaging with the planet gear parts; and one or more balancing gear parts disposed between the pair of ring gear parts and configured to rotate while engaging with the ring gear parts.

The load transmission restricting part may permit a rotation of the one or more balancing gear parts when the pair of pressing parts apply the braking force, and restrict the rotation of the one or more balancing gear parts when the pair of pressing parts release the braking force.

The load transmission restricting part may apply a rotational resistance force to the one or more balancing gear parts by pressing the one or more balancing gear parts.

The load transmission restricting part may press the one or more balancing gear parts in an axial direction.

The load transmission restricting part may include: a support plate fixed to a rotation shaft portion that supports the one or more balancing gear parts so that the one or more balancing gear parts is rotatable; pressing plates disposed to face the support plate and configured to come into contact with the one or more balancing gear parts; and a pressing member disposed between the support plate and the pressing plates and configured to press the pressing plates toward the one or more balancing gear parts.

The pressing member may be elastically deformable in a longitudinal direction thereof.

The pressing plates may include: a first pressing plate disposed to face one side of the one or more balancing gear parts; and a second pressing plate disposed to face another side of the one or more balancing gear parts and configured to receive a pressing force from the pressing member.

The second pressing plate may be installed to be movable in a longitudinal direction of the rotation shaft portion.

The brake apparatus may further include a stopper coupled to the rotation shaft portion and configured to support the support plate.

The stopper may be installed to be movable in a longitudinal direction of the rotation shaft portion and adjust an interval between the support plate and the pressing plates.

According to the brake apparatus for a vehicle according to the present disclosure, when the pressing load is concentrated on any one of the plurality of pressing parts when the braking force is applied, the load transmission part may transmit the pressing load to the remaining pressing part and allow the pressing parts to press the brake pad with the uniform load.

In addition, according to the brake apparatus for a vehicle according to the present disclosure, the load transmission restricting part may restrict the operation of the load transmission part when the braking force is released. Therefore, it is possible to quickly separate the pair of piston parts from the brake pad and prevent the drag caused by the incomplete release of the piston part.

DETAILED DESCRIPTION OF THE ILLUSTRATED EMBODIMENTS

Hereinafter, a brake apparatus for a vehicle will be described below with reference to the accompanying drawings through various exemplary embodiments.

Hereinafter, an embodiment of a brake apparatus for a vehicle according to the present disclosure will be described with reference to the accompanying drawings.

Here, thicknesses of lines illustrated in the drawings, sizes of constituent elements, or the like may be exaggerated for clarity and convenience of description. In addition, the terms used below are defined in consideration of the functions in the present disclosure and may vary depending on the intention of a user or an operator or a usual practice. Therefore, the definition of the terms should be made based on the entire contents of the present specification.

In addition, in the present specification, when one constituent element is referred to as being "connected to (or coupled to)" another constituent element, the constituent elements can be "directly connected to (coupled to)" each other, and can also be "indirectly connected to (coupled to)" each other with other elements interposed therebetween. In addition, unless explicitly described to the contrary, the word "comprise (or include)" and variations such as "comprises (or includes)" or "comprising (or including)" will be understood to imply the inclusion of stated elements, not the exclusion of any other elements.

In addition, throughout the specification, the same reference numerals denote the same constituent elements. Even though the same or similar reference numerals are not mentioned or described with reference to the specific drawings, the same or similar reference numerals may be described with reference to the other drawings. In addition, even though there are parts denoted by no reference numeral in the specific drawings, the parts may be described with reference to the other drawings. In addition, the numbers, shapes, sizes, relative differences in sizes, and the like of the detailed constituent elements illustrated in the drawings of the present application are set for convenience of understanding, do not limit the embodiments, and may be variously implemented.

Figure 1:
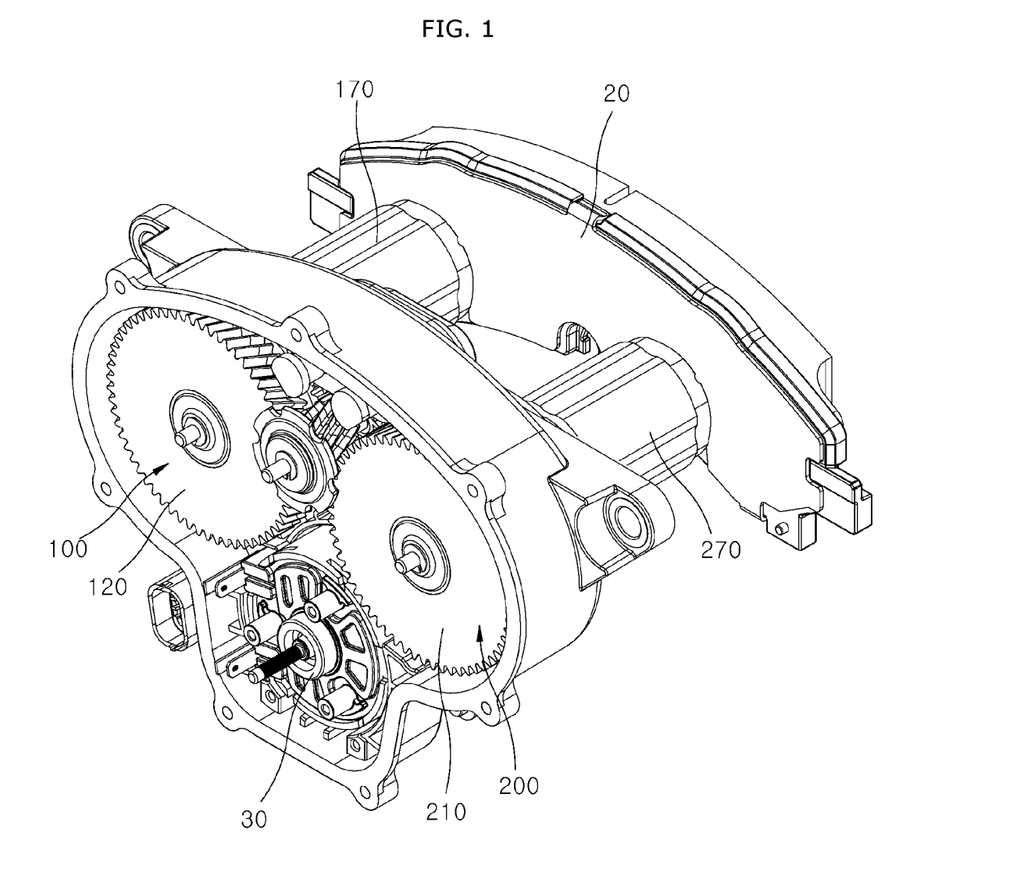
FIG. 1 is a perspective view schematically illustrating a configuration of a brake apparatus for a vehicle according to an embodiment of the present disclosure.
Figure 2:
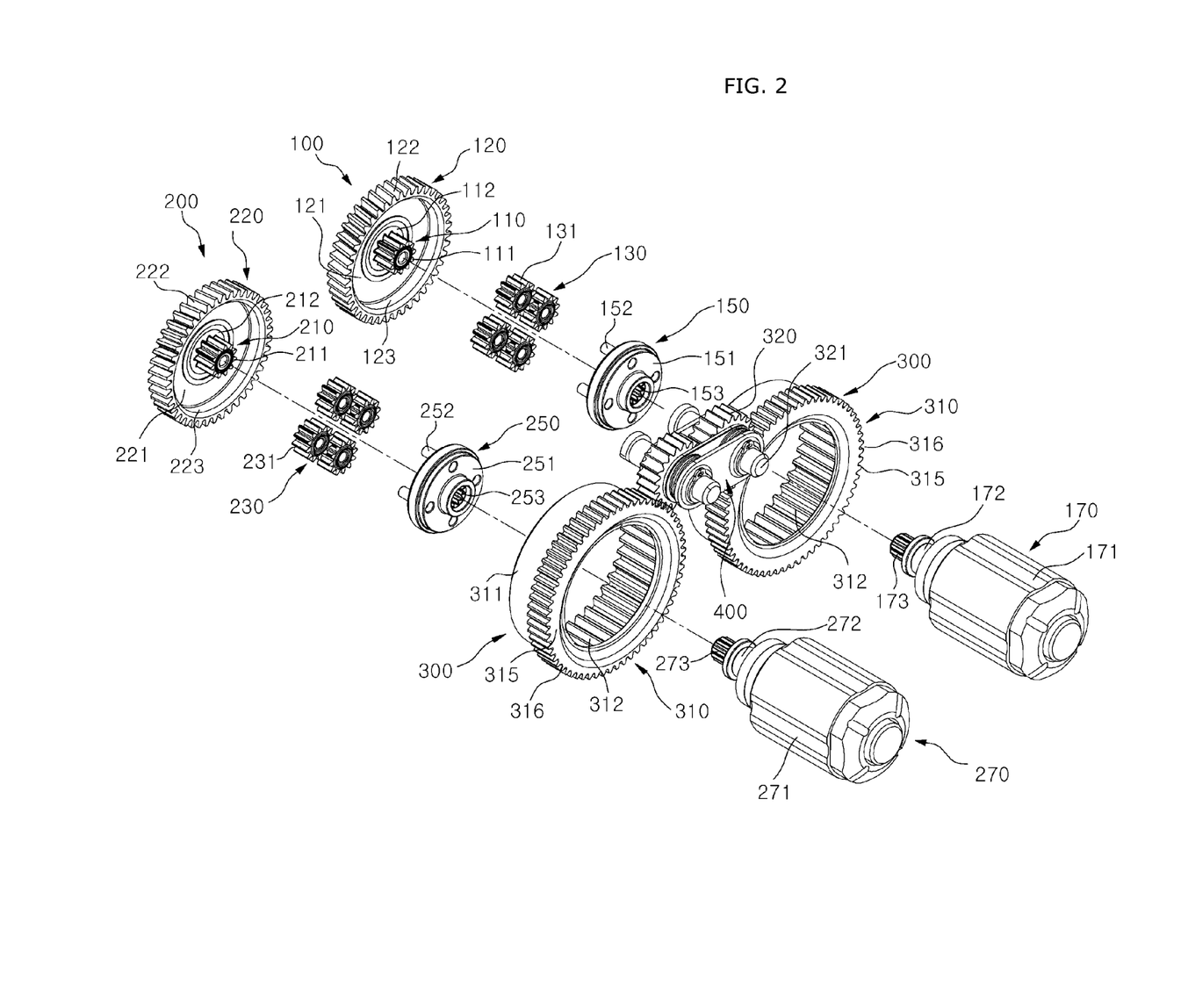
FIG. 2 is an exploded perspective view schematically illustrating the configuration of the brake apparatus for a vehicle according to the embodiment of the present disclosure.
Figure 3:
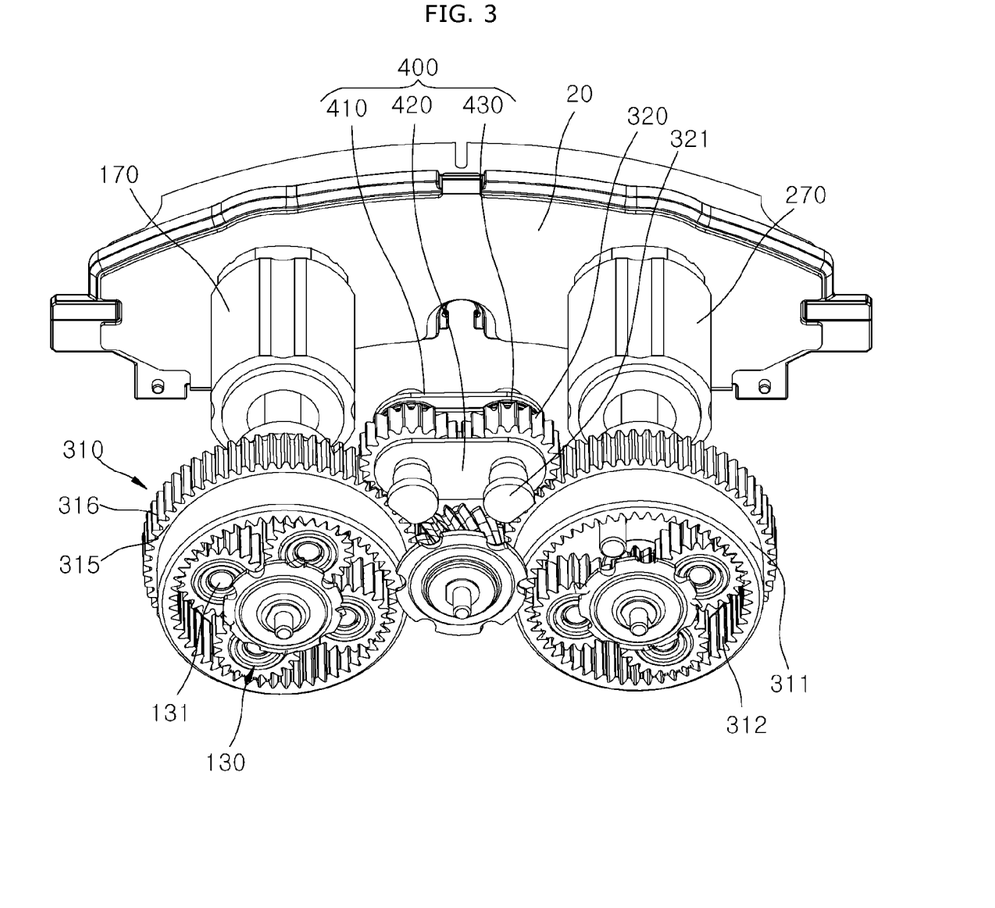
FIG. 3 is a front view schematically illustrating the configuration of the brake apparatus for a vehicle according to the embodiment of the present disclosure.

FIG. 1 is a perspective view schematically illustrating a configuration of a brake apparatus for a vehicle according to an embodiment of the present disclosure, FIG. 2 is a front view schematically illustrating the configuration of the brake apparatus for a vehicle according to the embodiment of the present disclosure, and FIG. 3 is an exploded perspective view schematically illustrating the configuration of the brake apparatus for a vehicle according to the embodiment of the present disclosure.

Referring to FIGS. 1 to 3, a brake apparatus 1 for a vehicle according to an embodiment of the present disclosure includes a housing 10, a drive part 30, pressing parts 100 and 200, a load transmission part 300, and a load transmission restricting part 400.

The housing 10 has therein a space in which the pressing parts 100 and 200, the load transmission part 300, and the load transmission restricting part 400 may be installed. The housing 10 may be openable and closable so that the components installed in the housing 10 may be easily replaced or managed. A specific shape of the housing 10 is not limited to a shape illustrated in FIG. 1 but may be variously designed and changed depending on shapes and sizes the pressing parts 100 and 200, the load transmission part 300, and the load transmission restricting part 400.

The drive part 30 includes an electric motor configured to generate power by being supplied with electric power from the outside, and a driving gear connected to an output shaft of the electric motor and configured to be rotated by the electric motor. The driving gear may be a spur gear, a bevel gear, a worm gear, or the like capable of transmitting a rotational force of the electric motor to the pressing parts 100 and 200 and variously designed and changed within the technical spirit of the power transmission means.

The pressing parts 100 and 200 are installed inside the housing 10. The pressing parts 100 and 200 apply braking forces to the vehicle by receiving the power from the drive part 30 and pressing a brake pad 20 that generates contact friction with a disc (not illustrated).

The pressing part 100 or 200 is provided in plural, and the plurality of pressing parts 100 or 200 is disposed in parallel. The pressing parts 100 and 200 are symmetrically installed at left and right sides (based on FIG. 2) based on a central portion of the brake pad 20.

The pressing part 100 or 200 according to the embodiment of the present disclosure includes a sun gear part 110 or 210, a connection gear part 120 or 220, a planet gear part 130 or 230, a carrier part 150 or 250, and a piston part 170 or 270.

The connection gear part 120 or 220 according to the embodiment of the present disclosure includes a connection gear main body 121 or 221, a connection wheel 122 or 222, and a connection insertion portion 123 or 223.

The connection gear main body 121 or 221 defines a schematic external appearance of the connection gear part 120 or 220. The connection gear main body 121 or 221 according to the embodiment of the present disclosure may be provided in the form of an approximately circular plate.

The connection wheel 122 or 222 is formed on an outer peripheral surface of the connection gear main body 121 or 221. The connection wheel 122 or 222 according to the embodiment of the present disclosure may have gear teeth continuously extending along the outer peripheral surface of the connection gear main body 121 or 221. The connection wheels 122 and 222 engage with the drive part 30, specifically, the driving gear. Therefore, the power of the drive part 30 may be transmitted to the connection gear parts 120 and 220 and rotate the connection gear parts 120 and 220.

The connection insertion portion 123 or 223 is formed in an internal space of the connection wheel 122 or 222. That is, the connection wheel 122 or 222 is formed outside a wall formed along the outer peripheral surface of the connection gear main body 121 or 221. The connection insertion portion 123 or 223 is formed in the internal space of the wall on which the connection wheel 122 or 222 is formed. The connection insertion portion 123 or 223 according to the embodiment of the present disclosure is provided in the form of a concave groove. Ring gear parts 310, more specifically, ring gear inner portions 311, which will be described below, are respectively inserted into the connection insertion portions 123 and 223.

The sun gear parts 110 and 210 rotate by receiving the power from the drive part 30. According to the present embodiment, the sun gear part 110 or 210 is coupled to the connection gear part 120 or 220. The sun gear part 110 or 210 may rotate by means of the connection gear part 120 or 220 that receives the power from the drive part 30.

The sun gear part 110 or 210 is concentric with a rotation center of the connection gear part 120 or 220. Therefore, when the power is transmitted to the connection gear parts 120 and 220 by a power transmission part 70, the connection gear part 120 rotates on the same rotation axis as the sun gear part 110, and the connection gear part 220 rotates on the same rotation axis as the sun gear part 210. The sun gear part 110 or 210 is disposed inside an inner peripheral surface of the connection gear part 120 or 220 on which the connection insertion portion 123 or 223 is formed.

The sun gear part 110 may be integrated with the connection gear part 120, and the sun gear part 210 may be integrated with the connection gear part 220. Alternatively, the sun gear part 110 or 210 may be formed separately from the connection gear part 120 or 220 and integrated with the connection gear part 120 or 220 by being coupled. Since the sun gear part 110 or 210 is integrated with the connection gear part 120 or 220, the sun gear part 110 or 210 also rotates when the connection gear part 120 or 220 rotates by receiving the power from the drive part 30.

The sun gear part 110 or 210 according to the embodiment of the present disclosure includes a sun gear 111 or 211, and a sun gear connection body 112 or 212.

The sun gear connection body 112 or 212 is coupled to the connection gear main body 121 or 221.

The sun gear 111 or 211 is formed at a central portion of the sun gear connection body 112 or 212 and has gear tooth formed on an outer peripheral surface thereof so as to engage with the planet gear part 130 or 230.

The planet gear part 130 or 230 engages with the sun gear 111 or 211 and rotates and revolves.

The planet gear part 130 or 230 has a plurality of planet gears 131 or 231. The present embodiment provides an example in which four planet gears 131 or 231 are disposed, but the present disclosure is not limited thereto. The number of planet gears may be three or less or five or more.

The plurality of planet gears 131 or 231 is disposed at an equal angle around a rotation center of the sun gear 111 or 211. The plurality of planet gears 131 or 231 engages with the sun gear 111 or 211 and rotates and/or revolves when the sun gear 111 or 211 rotates.

The planet gear part 130 or 230 is coupled to the carrier part 150 or 250. When the plurality of planet gears 131 or 231 revolves, the carrier part 150 or 250 also rotates clockwise or counterclockwise.

The carrier part 150 or 250 according to the embodiment of the present disclosure includes a carrier main body 151 or 251, carrier rotation shafts 152 or 252, and a carrier connecting portion 153 or 253.

The carrier rotation shaft 152 or 252 protrudes from the carrier main body 151 or 251 toward the planet gear part 130 or 230.

The carrier rotation shaft 152 or 252 is provided in plural, and the plurality of carrier rotation shafts 152 or 252 is equal in number to the planet gear part 130 or 230. The carrier rotation shaft 152 or 252 is penetratively coupled to the planet gear part 130 or 230. Therefore, the planet gear part 130 or 230 may rotate and revolve on the carrier rotation shafts 152 or 252.

The carrier connecting portion 153 or 253 is formed on an inner peripheral surface of the carrier main body 151 or 251 and connected to a piston connecting portion 173 or 273 of the piston part 170 or 270.

In the present embodiment, the carrier connecting portion 153 or 253 is provided in the form of a concave groove. The piston connecting portion 173 or 273 is provided in the form of a protrusion and inserted into the carrier connecting portion 153 or 253.

On the contrary, the piston connecting portion 173 or 273 may be provided in the form of a concave groove, and the carrier connecting portion 153 or 253 may be provided in the form of a protrusion and inserted into the piston connecting portion 173 or 273.

The carrier connecting portion 153 or 253 may be coupled to the piston connecting portion 173 or 273 by means of splines. The carrier part 150 or 250 and the piston part 170 or 270 may of course be coupled by means of screws, for example, in addition to the splines.

The piston part 170 or 270 is connected to the carrier part 150 or 250. The piston part 170 or 270 extends or retracts while converting a rotational motion of the carrier part 150 or 250 into a rectilinear motion. The piston part 170 or 270 applies or releases the braking force by pressing or releasing the brake pad 20 while extending or retracting.

The piston part 170 or 270 according to the embodiment of the present disclosure may include a piston main body 171 or 271, a piston shaft 172 or 272, and the piston connecting portion 173 or 273.

The piston main body 171 or 271 has a hollow portion therein and moves to be in contact with the brake pad 20. The piston main body 171 or 271 may have a cylindrical shape.

The piston main body 171 or 271 is coupled to the piston shaft 172 or 272, and the piston connecting portion 173 or 273 is formed at an end of the piston shaft 172 or 272 directed toward the carrier part 150 or 250.

When the carrier part 150 or 250 rotates, the piston connecting portion 173 or 273 coupled to the carrier connecting portion 153 or 253 by means of the splines rotates, such that a rotational motion of the carrier part 150 or 250 is converted into a rectilinear motion of the piston part 170 or 270.

As the piston part 170 or 270 rectilinearly moves, the piston part 170 or 270 moves toward the brake pad 20. Therefore, the piston part 170 or 270 comes into contact with the brake pad 20 and presses the brake pad 20, and the braking force is generated by friction between the brake pad 20 and the disc.

The load transmission part 300 is connected to the pair of pressing parts 100 and 200 and transmits a pressing load of any one of the pressing parts 100 and 200 to the other of the pressing parts 100 and 200.

The load transmission parts 300 according to the embodiment of the present disclosure may include the pair of ring gear parts 310 and one or more balancing gear parts 320.

The pair of ring gear parts 310 is respectively coupled to the planet gear parts 130 and 230 of the different pressing parts 100 and 200. Inner peripheral surfaces of the pair of ring gear parts 310 may respectively engage with the planet gear parts 130 and 230, such that the pair of ring gear parts 310 may rotate. Outer peripheral surfaces of the pair of ring gear parts 310 may indirectly engage with each other by means of the one or more balancing gear parts 320. That is, the balancing gear parts 320 may be disposed between the pair of ring gear parts 310 and engage with the ring gear parts 310. Each of the ring gear parts 310 may be installed between the planet gear 131 or 231 and the connection wheel 122 or 222.

The ring gear part 310 according to the embodiment of the present disclosure includes the ring gear inner portion 311 and a ring gear outer portion 315.

The ring gear inner portion 311 may be disposed outside the planet gear part 130 or 230 and have an inner gear portion 312 formed along an inner peripheral surface thereof so as to engage with the planet gear part 130 or 230.

The ring gear outer portion 315 is coupled to an outer surface of the ring gear inner portion 311 and has an outer gear portion 316 formed along an outer peripheral surface thereof so as to engage with the balancing gear part 320. The ring gear outer portion 315 may be integrated with the ring gear inner portion 311.

When the inner gear portion 312 of the ring gear inner portion 311 installed at one side (the left side based on FIG. 3) rotates while engaging with the planet gear part 130, the ring gear outer portion 315 integrated with the ring gear inner portion 311 also rotates in the same direction as the inner gear portion 312.

Figure 5:
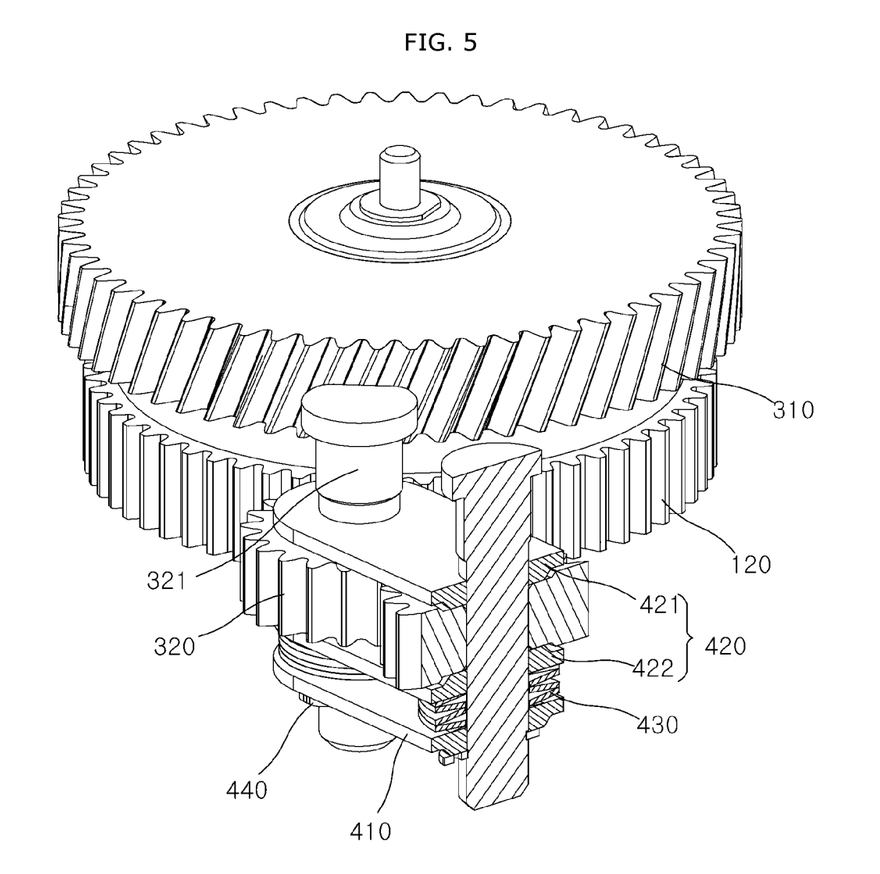
FIG. 5 is a perspective view schematically illustrating a configuration of the load transmission restricting part according to the embodiment of the present disclosure.

Therefore, a rotational force of the ring gear outer portion 315 at one side is transmitted through the balancing gear parts 320 to the ring gear part 310, particularly, the ring gear outer portion 315 disposed at the other side (the right side based on FIG. 5).

The balancing gear parts 320 rotate while engaging with the ring gear parts 310, particularly, the outer gear portions 316 formed on the ring gear outer portions 315, and transmit the rotational power of the ring gear part 310 disposed at the one side to the ring gear part 310 disposed at the other side.

More specifically, when pressing loads for pressing the pair of pressing parts 100 and 200, particularly, the pair of piston parts 170 and 270 against the brake pad 20 are not uniformly applied, the balancing gear parts 320 transmit the pressing load of the piston part 170 disposed at one side to the piston part 270 disposed at the other side, thereby bringing the pair of piston parts 170 and 270 into contact with the brake pad 20 with the uniform pressing load. On the contrary, the balancing gear parts 320 may of course transmit the pressing load of the piston part 270 disposed at the other side to the piston part 170 disposed at one side.

The balancing gear part 320 according to the embodiment of the present disclosure is provided in the form of a spur gear. A central portion of the balancing gear part 320 is inserted into a rotation shaft portion 321, such that the balancing gear part 320 is rotatably supported by the rotation shaft portion 321. The balancing gear part 320 rotates while engaging with the outer gear portion 316 formed along the outer peripheral surface of the ring gear outer portion 315. However, the balancing gear part 320 may have various shapes, such as a bevel gear shape or a helical gear shape having gear teeth inclined at a predetermined angle with respect to a rotation center axis of the balancing gear part 320, in addition to the spur gear shape.

In addition, the present disclosure is not limited to the example in which the balancing gear part 320 has a gear shape. Various modified examples may be made. For example, the balancing gear part 320 may be provided in the form of a belt connected to the pair of ring gear parts 310 and transmit the power from one pressing part 100 to the other pressing part 200.

The balancing gear part 320 may be provided in plural. Therefore, the present disclosure is not limited to the present embodiment in which the two balancing gear parts 320 are provided. Various modified examples may be made. For example, one or three or more balancing gear parts may be provided depending on a distance between the pair of ring gear parts 310.

The load transmission restricting part 400 selectively restricts the operation of the load transmission part 300 by pressing the load transmission part 300. More specifically, the load transmission restricting part 400 selectively restricts the operation of the load transmission part 300 by applying a rotational resistance force with a preset magnitude to the balancing gear parts 320 by pressing the balancing gear parts 320 in the axial direction.

That is, the load transmission restricting part 400 permits the rotations of the balancing gear parts 320 when the braking force is applied such that a relatively high operating load is applied to the pressing parts 100 and 200 by the rotational resistance force. Therefore, the load transmission restricting part 400 may allow the load transmission part 300 to smoothly eliminate a load deviation between the pair of pressing parts 100 and 200 during the process of applying the braking force.

In addition, the load transmission restricting part 400 restricts the rotations of the balancing gear parts 320 when the braking force applied by the pressing parts 100 and 200 is released such that a relatively low operating load is applied to the pressing parts 100 and 200. Therefore, the load transmission restricting part 400 may allow the pair of pressing parts 100 and 200 to quickly separate from the brake pad 20 during the process of releasing the braking force, thereby preventing the drag caused by the residual load.

In this case, a magnitude of the rotational resistance force applied by the load transmission restricting part 400 may be set to be smaller than a magnitude of the rotational force transmitted to the balancing gear parts 320 from the ring gear part 310 when the braking force is applied by the pressing parts 100 and 200, and larger than a magnitude of the rotational force transmitted to the balancing gear parts 320 from the ring gear part 310 when the braking force applied by the pressing parts 100 and 200 is released.

Figure 4:
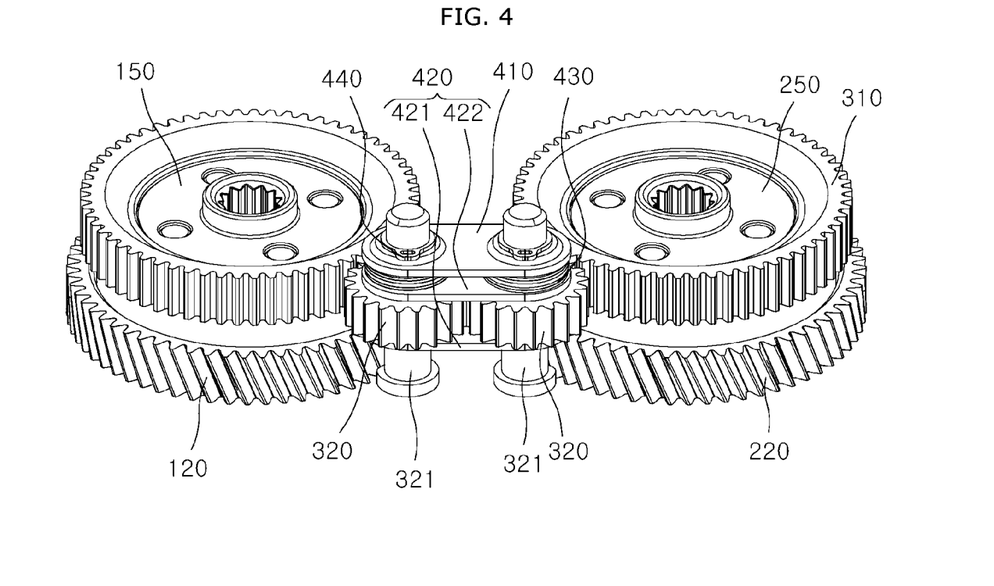
FIG. 4 is an enlarged view schematically illustrating an installed state of a load transmission restricting part according to the embodiment of the present disclosure.
Figure 6:
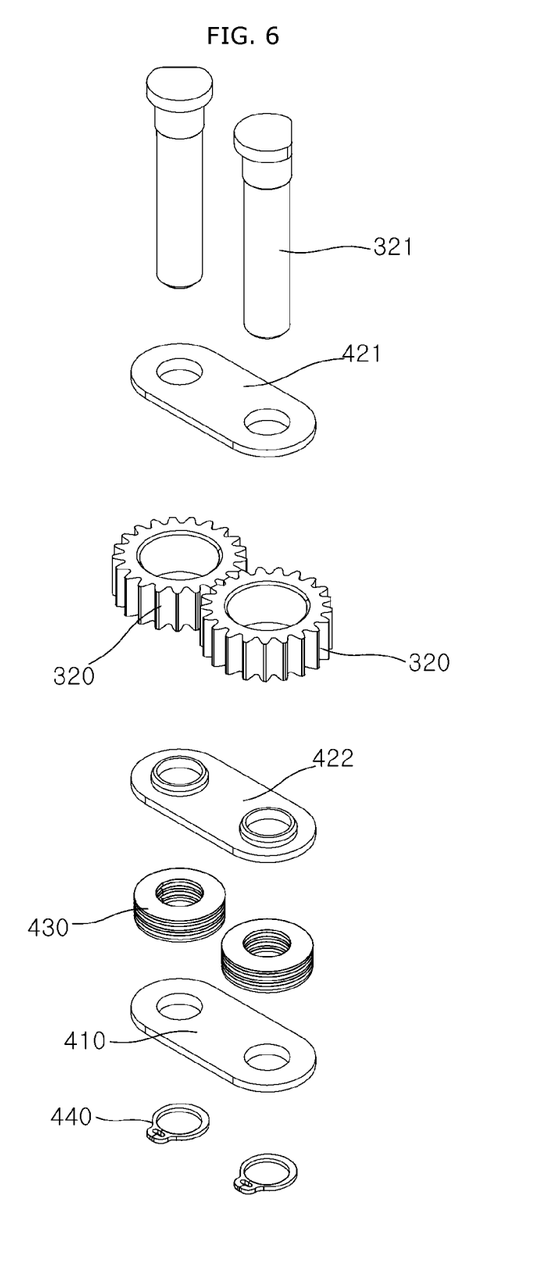
FIG. 6 is an exploded perspective view schematically illustrating the configuration of the load transmission restricting part according to the embodiment of the present disclosure.

FIG. 4 is an enlarged view schematically illustrating an installed state of the load transmission restricting part according to the embodiment of the present disclosure, FIG. 5 is a perspective view schematically illustrating a configuration of the load transmission restricting part according to the embodiment of the present disclosure, and FIG. 6 is an exploded perspective view schematically illustrating the configuration of the load transmission restricting part according to the embodiment of the present disclosure.

Referring to FIGS. 4 to 6, the load transmission restricting part 400 according to the embodiment of the present disclosure includes a support plate 410, pressing plates 420, pressing members 430, and stoppers 440.

The support plate 410 is fixed to the rotation shaft portion 321 and supports the pressing members 430 to be described below. The support plate 410 according to the embodiment of the present disclosure may be provided in the form of a plate disposed in parallel with the balancing gear parts 320 and facing the balancing gear parts 320. The support plate 410 is spaced apart from lower surfaces of the balancing gear parts 320 at a predetermined interval in the axial direction of the balancing gear parts 320. The rotation shaft portions 321 may be inserted into the support plate 410 so that the support plate 410 is slidable in a longitudinal direction of the rotation shaft portion 321. The support plate 410 may be fixed in position by adjoining the stopper 440 to be described below in the state in which the rotation shaft portions 321 are inserted into the support plate 410.

The pressing plates 420 are disposed to face the support plate 410 and in contact with the balancing gear parts 320. The pressing plates 420 are in close contact with the balancing gear parts 320 by receiving the pressing force from the pressing members 430 to be described below. Therefore, the rotational resistance force applied to the balancing gear parts 320 by the load transmission restricting part 400 may be generated by the frictional force applied between the pressing plates 420 and the balancing gear parts 320.

The pressing plates 420 according to the embodiment of the present disclosure include a first pressing plate 421 and a second pressing plate 422.

The first pressing plate 421 is disposed to face one side of each of the balancing gear parts 320. The first pressing plate 421 according to the embodiment of the present disclosure may be provided in the form of a plate disposed in parallel with upper surfaces of the balancing gear parts 320 and facing the balancing gear parts 320. The first pressing plate 421 is fixed at a position at which a lower surface of the first pressing plate 421 is in contact with the upper surfaces of the balancing gear parts 320. The first pressing plate 421 is in close contact with the upper surfaces of the balancing gear parts 320 by the reaction force generated when the second pressing plate 422 to be described below is in close contact with the lower surfaces of the balancing gear parts 320. The first pressing plate 421 may be integrated with the rotation shaft portion 321. Alternatively, the first pressing plate 421 may be fixed to the rotation shaft portion 321 by a separate fixing means, a bonding agent, or the like in the state in which the rotation shaft portion 321 is inserted into the first pressing plate 421.

The second pressing plate 422 is disposed to face the other side of each of the balancing gear parts 320 and receives the pressing force from the pressing members 430. The second pressing plate 422 according to the embodiment of the present disclosure may be provided in the form of a plate disposed between the upper surface of the support plate 410 and the lower surfaces of the balancing gear parts 320. The second pressing plate 422 is disposed in parallel with the upper surface of the support plate 410 and the lower surfaces of the balancing gear parts 320. The second pressing plate 422 may be installed to be movable in the longitudinal direction of the rotation shaft portion 321 in the state in which the rotation shaft portion 321 is inserted into the second pressing plate 422. The lower surface of the second pressing plate 422 adjoins the pressing members 430 to be described below and receives the pressing force from the pressing members 430. The upper surface of the second pressing plate 422 is in close contact with the lower surfaces of the balancing gear parts 320 by the pressing force transmitted from the pressing members 430.

Therefore, since the first and second pressing plates 421 and 422 are in close contact with the two opposite surfaces of the balancing gear parts 320, the rotational resistance force may be applied to the balancing gear parts 320 through the frictional force generated between the first and second pressing plates 421 and 422 and the balancing gear parts 320.

The pressing members 430 are provided between the support plate 410 and the pressing plates 420 and press the pressing plates 420 toward the balancing gear parts 320. The pressing members 430 according to the embodiment of the present disclosure may be provided in the form of a disc spring, a coil spring, or the like elastically deformable in the longitudinal direction thereof. The pressing members 430 are disposed between the upper surface of the support plate 410 and the lower surface of the second pressing plate 422. Two opposite ends of each of the pressing members 430 are fixed by adjoining the upper surface of the support plate 410 and the second pressing plate 422. The pressing member 430 compressed into a predetermined length may be installed between the support plate 410 and the second pressing plate 422. Therefore, an elastic restoring force of the pressing members 430 may press the second pressing plate 422 toward the balancing gear parts 320.

The stoppers 440 are fixed to the rotation shaft portions 321 and support the support plate 410 on the rotation shaft portions 321. The stopper 440 according to the embodiment of the present disclosure may be fixed to the rotation shaft portion 321 by means of various coupling structures using press-fitting, screw coupling, or the like. The stoppers 440 fix an installation position of the support plate 410 by supporting the lower surface of the support plate 410 in the state in which the stoppers 440 are fixed to the rotation shaft portions 321. Therefore, the stoppers 440 may prevent the support plate 410 from being arbitrarily moved in the longitudinal direction of the rotation shaft portions 321 by the reaction force applied from the pressing members 430.

The stoppers 440 are installed to be movable in the longitudinal direction of the rotation shaft portions 321, such that coupling positions of the stoppers 440 with respect to the rotation shaft portions 321 may be adjusted. The stoppers 440 move in the longitudinal direction of the rotation shaft portions 321, thereby adjusting an interval between the support plate 410 and the pressing plates 420, more particularly, an interval between the support plate 410 and the second pressing plate 422. Therefore, the stoppers 440 may change a degree to which the pressing member 430 is compressed, thereby adjusting the magnitude of the pressing force applied to the balancing gear parts 320 from the pressing members 430.

Hereinafter, an operational principle of the brake apparatus 1 for a vehicle configured as described above will be described.

Figure 7:
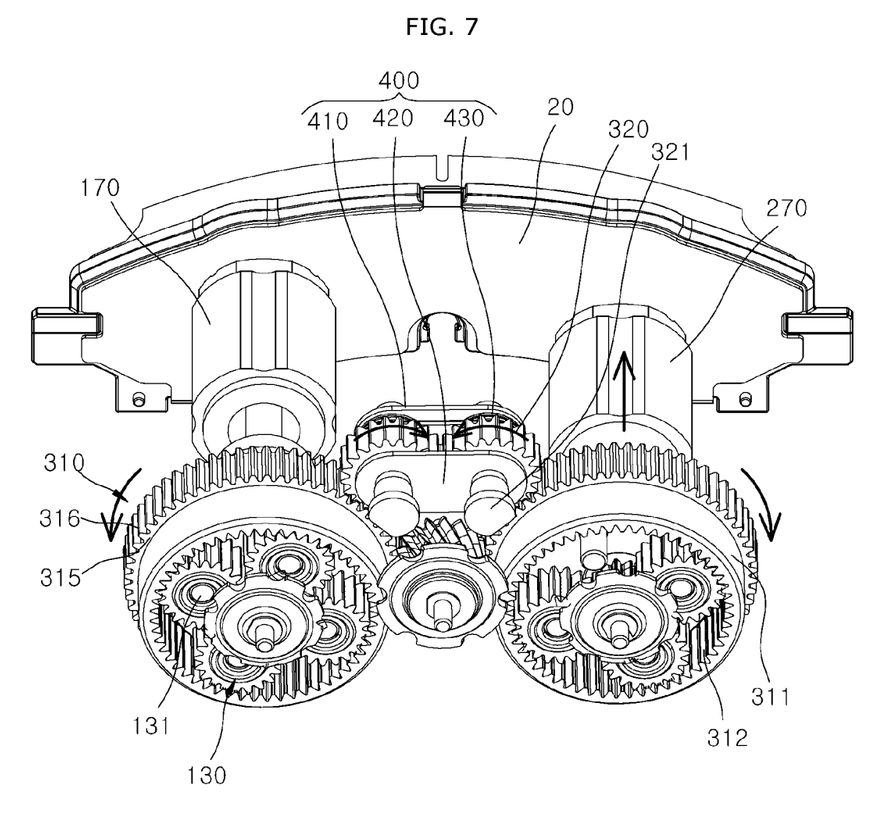
FIGS. 7 to 9 are operational views schematically illustrating a process in which the brake apparatus for a vehicle according to the embodiment of the present disclosure applies a braking force.
Figure 8:
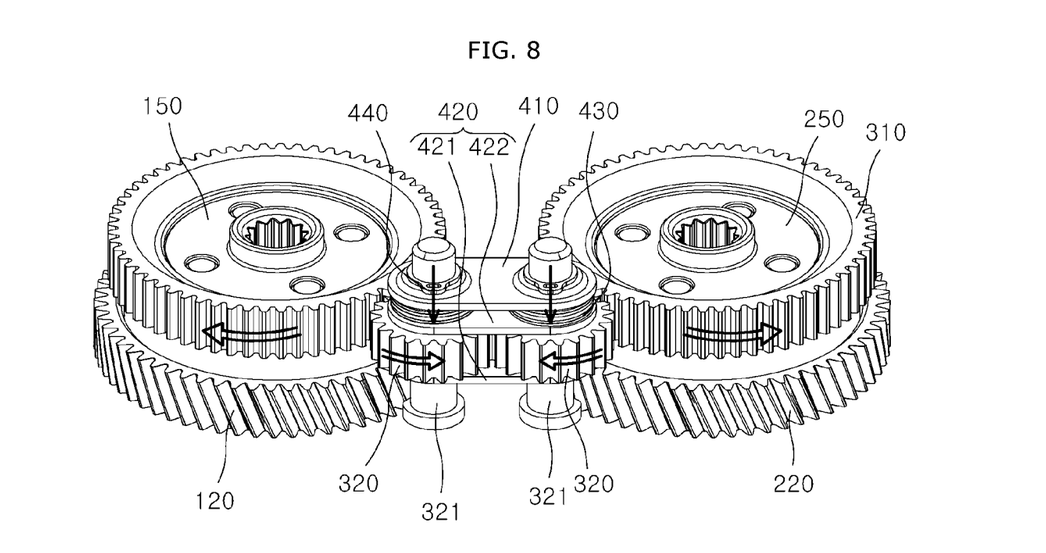
Figure 9:
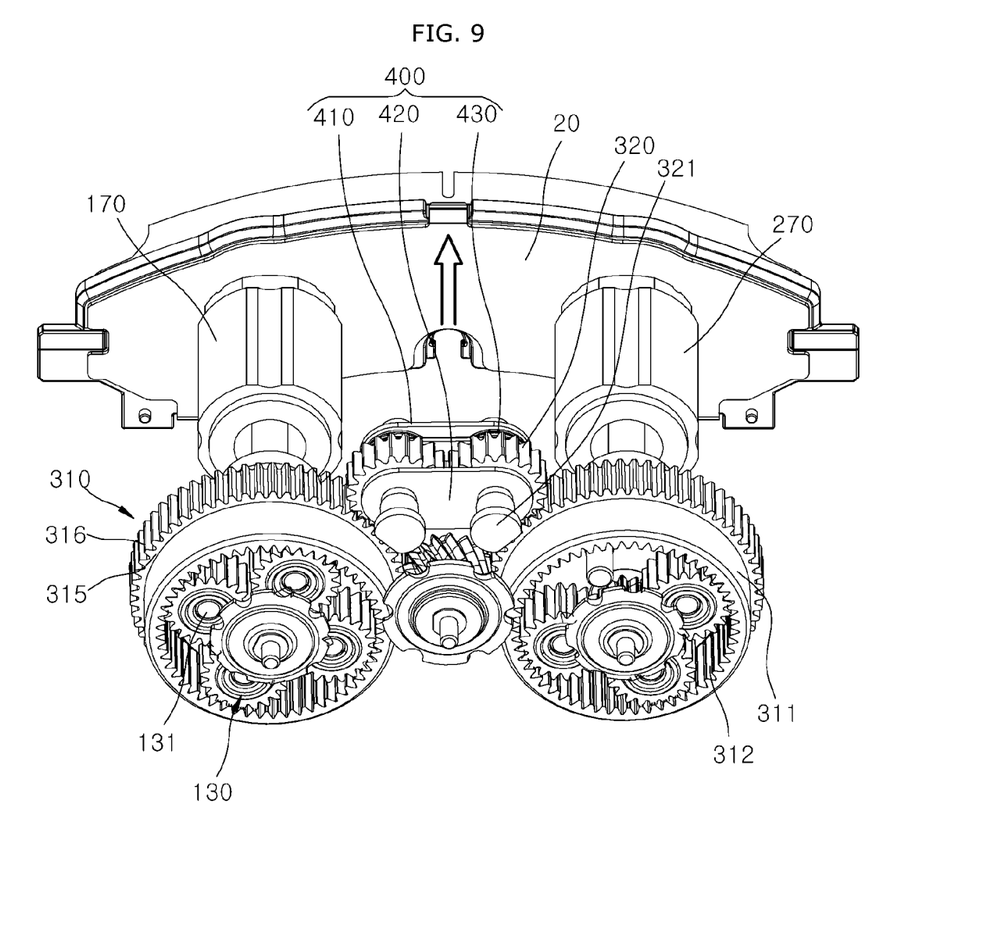

FIGS. 7 to 9 are operational views schematically illustrating a process in which the brake apparatus for a vehicle according to the embodiment of the present disclosure applies the braking force.

Referring to FIGS. 7 to 9, to apply the braking force, the electric motor generates power by receiving electric power from the outside, and the connection gear parts 120 and 220 connected to the output shaft of the electric motor through the driving gear rotate.

The sun gear parts 110 and 210 also rotate in conjunction with the rotations of the connection gear parts 120 and 220. The planet gears 131 and 231 engaging with the sun gears 111 and 211 revolve about the sun gears 111 and 211 while rotating about their rotation centers.

As the planet gears 131 and 231 revolve, the carrier parts 150 and 250 coupled to the planet gears 131 and 231 rotate clockwise or counterclockwise. As the carrier parts 150 and 250 rotate, the piston parts 170 and 270 coupled to the carrier parts 150 and 250 move toward the brake pad 20 and come into contact with and press the brake pad 20.

Because of several reasons, a larger amount of power provided from the drive part 30 may be transmitted to any one of the pair of pressing parts 100 and 200.

For example, when the pressing part 100 disposed at one side (the left side based on FIG. 7) receives a larger amount of power than the pressing part 200 disposed at the other side (the right side based on FIG. 7), the piston part 170 disposed at one side may come into contact with the brake pad 20 before the piston part 270 disposed at the other side comes into contact with the brake pad 20.

The planet gear part 130 of the pressing part 100 disposed at one side only rotates about its rotation axis in a state in which the piston part 170 disposed at one side is already in contact with the brake pad 20 and the piston part 270 disposed at the other side is not yet in contact with the brake pad 20. That is, the planet gear part 130 does not revolve.

More specifically, since the power generated by the operation of the drive part 30 is continuously transmitted to the sun gear 111, the sun gear 111 continuously rotates. In this case, because the piston part 170 is already in contact with the brake pad 20, the plurality of planet gears 131 engaging with the sun gear 111 only rotates about their rotation center without revolving.

The ring gear part 310 disposed at one side rotates clock or counterclockwise in conjunction with the rotations of the plurality of planet gears 131.

As the ring gear part 310 disposed at one side rotates, the ring gear outer portion 315 integrally coupled to the ring gear inner portion 311 transmits the rotational force to the balancing gear parts 320.

Because of the reaction force between the brake pad 20 and the piston part 170, a load, which is higher than a load applied when the braking force is released, is transmitted to the ring gear part 310 when the braking force is applied.

Therefore, the rotational force transmitted to the balancing gear parts 320 from the ring gear part 310 disposed at one side becomes higher than the rotational resistance force applied to the balancing gear parts 320 by the load transmission restricting part 400, such that the balancing gear parts 320 rotate.

As the balancing gear parts 320 rotate, the power provided to the pressing part 100 disposed at one side is transmitted to the piston part 270 at the other side sequentially through the balancing gear parts 320, the outer gear portion 316 disposed at the other side, the inner gear portion 312 of the ring gear inner portion 311, the planet gear part 230, and the carrier part 250 coupled to the planet gear part 230.

Therefore, the power provided by the drive part 30 is transmitted to the piston part 270 disposed at the other side, which is not yet in contact with the brake pad 20, and the rectilinear movement of the piston part 170 which is disposed at one side and already in contact with the brake pad 20, is stopped until the piston part 270 disposed at the other side comes into contact with the brake pad 20.

Thereafter, when both the piston parts 170 and 270 disposed at one side and the other side are in contact with the brake pad 20, the power of the drive part 30 is uniformly transmitted to the piston parts 170 and 270 disposed at one side and the other side. Therefore, the brake pad 20 may be simultaneously pressed by the uniform load.

Figure 10:
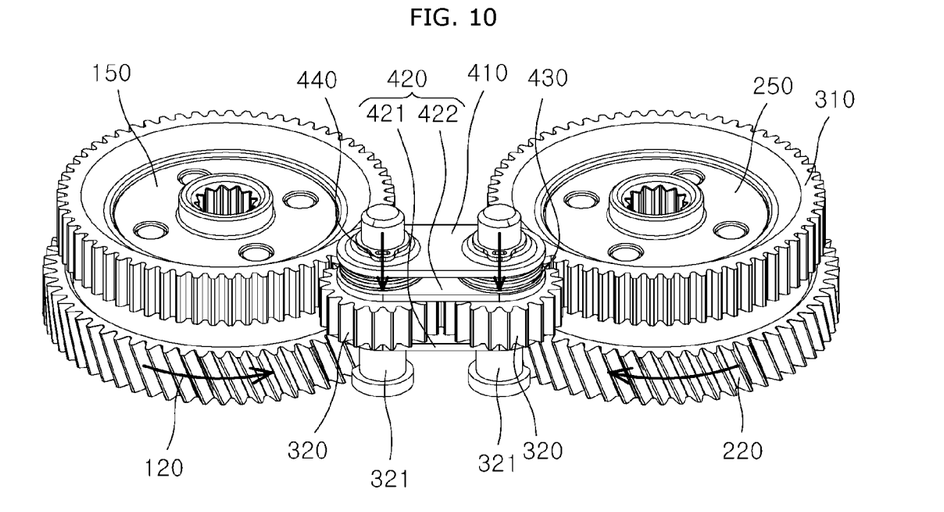
FIGS. 10 and 11 are operational views schematically illustrating a process in which the brake apparatus for a vehicle according to the embodiment of the present disclosure releases the braking force.
Figure 11:
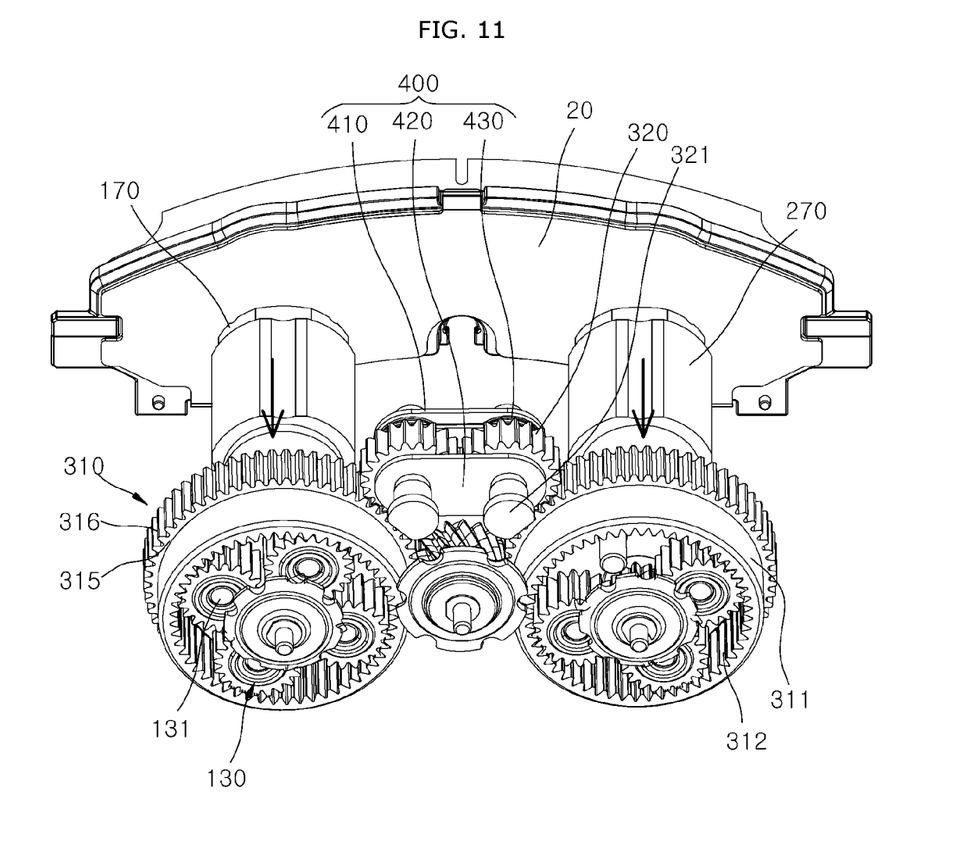

FIGS. 10 and 11 are operational views schematically illustrating a process in which the brake apparatus for a vehicle according to the embodiment of the present disclosure releases the braking force.

To release the braking force, the electric motor generates power by receiving electric power from the outside, and the connection gear parts 120 and 220 connected to the output shaft of the electric motor through the driving gear rotate in a direction opposite to the direction in which the connection gear parts 120 and 220 rotate when the braking force is applied.

The sun gear parts 110 and 210 also rotate in conjunction with the rotations of the connection gear parts 120 and 220. The planet gears 131 and 231 engaging with the sun gears 111 and 211 revolve about the sun gears 111 and 211 while rotating about their rotation centers.

As the planet gears 131 and 231 revolve, the carrier parts 150 and 250 coupled to the planet gears 131 and 231 rotate in a direction opposite to the direction in which the carrier parts 150 and 250 rotate when the braking force is applied. As the carrier parts 150 and 250 rotate, the piston parts 170 and 270 coupled to the carrier parts 150 and 250 move away from the brake pad 20, thereby releasing the brake pad 20.

Because of several reasons, a larger amount of power provided from the drive part 30 may be transmitted to any one of the pair of pressing parts 100 and 200.

The reaction force is not applied between the brake pad 20 and the piston part 170 even though a load deviation occurs between the pair of pressing parts 100 and 200 when the braking force is released. Therefore, a load, which is lower than a load applied when the braking force is applied, is transmitted to the ring gear part 310.

Therefore, the rotational force transmitted to the balancing gear parts 320 from the ring gear part 310 disposed at one side becomes lower than the rotational resistance force applied to the balancing gear parts 320 by the load transmission restricting part 400, such that the balancing gear parts 320 do not rotate.

Because the balancing gear parts 320 do not rotate, the pair of ring gear parts 310 do not rotate, such that the load is not transmitted through the load transmission part 300.

Thereafter, the loads transmitted from the drive part 30 to the pair of pressing parts 100 and 200 are transmitted directly to the pair of piston parts 170 and 270 as they are.

Therefore, the pair of piston parts 170 and 270 may quickly move away from the brake pad 20.

While the present disclosure has been described with reference to the exemplary embodiment depicted in the drawings, the exemplary embodiment is described just for illustration, and those skilled in the art will understand that various modifications of the exemplary embodiment and any other exemplary embodiment equivalent thereto are available. Accordingly, the technical protection scope of the present disclosure should be determined by the appended claims.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:
1. A brake apparatus for a vehicle, comprising:
a drive part configured to generate driving power;
a pair of pressing parts configured to receive the driving power from the drive part and to apply or release a braking force;

a load transmission part installed between the pair of pressing parts and configured to transmit a pressing load of any one of the pair of pressing parts to the other pressing part of the pair of pressing parts; and a load transmission restricting part configured to selectively restrict an operation of the load transmission part by pressing the load transmission part, wherein each of the pair of pressing parts comprises:

a sun gear part configured to rotate by receiving the driving power from the drive part; and a planet gear part configured to rotate while engaging with the sun gear part, wherein the load transmission part comprises:

a pair of ring gear parts configured to rotate while engaging with the planet gear parts; and one or more balancing gear parts disposed between the pair of ring gear parts and configured to rotate while engaging with the ring gear parts, and wherein the load transmission restricting part comprises:

a support plate fixed to a rotation shaft portion that supports the one or more balancing gear parts so that the one or more balancing gear parts is rotatable;

pressing plates disposed to face the support plate and configured to come into contact with the one or more balancing gear parts; and a pressing member disposed between the support plate and the pressing plates and configured to press the pressing plates toward the one or more balancing gear parts.

2. The brake apparatus of claim 1, wherein each of the pair of pressing parts further comprises:

a carrier part coupled to the planet gear part; and a piston part connected to the carrier part and configured to press or release a brake pad while extending or retracting by receiving a rotational force from the carrier part.

3. The brake apparatus of claim 1, wherein the load transmission restricting part permits rotation of the one or more balancing gear parts when the pair of pressing parts apply the braking force, and the load transmission restricting part restricts the rotation of the one or more balancing gear parts when the pair of pressing parts release the braking force.

4. The brake apparatus of claim 1, wherein the load transmission restricting part applies a rotational resistance force to the one or more balancing gear parts by pressing the one or more balancing gear parts.

5. The brake apparatus of claim 1, wherein the load transmission restricting part presses the one or more balancing gear parts in an axial direction.

6. The brake apparatus of claim 1, wherein the pressing member is elastically deformable in a longitudinal direction thereof.

7. The brake apparatus of claim 1, wherein the pressing plates comprise:

a first pressing plate disposed to face one side of the one or more balancing gear parts; and a second pressing plate disposed to face another side of the one or more balancing gear parts and configured to receive a pressing force from the pressing member.

8. The brake apparatus of claim 7, wherein the second pressing plate is installed to be movable in a longitudinal direction of the rotation shaft portion.

9. The brake apparatus of claim 1, further comprising:

a stopper coupled to the rotation shaft portion and configured to support the support plate.

10. The brake apparatus of claim 9, wherein the stopper is installed to be movable in a longitudinal direction of the rotation shaft portion and is configured to adjust an interval between the support plate and the pressing plates.

* * * * *